United States Patent
Weisker et al.

[15] 3,695,463
[45] Oct. 3, 1972

[54] MATERIALS HANDLING STACKER POSITIONING APPARATUS

[72] Inventors: Alexander Weisker, Easton; Raymond L. Smith, Jr., Southbury, both of Conn.

[73] Assignee: C&M Manufacturing Company, Inc., Bethesda, Md.

[22] Filed: May 8, 1970

[21] Appl. No.: 35,711

[52] U.S. Cl. .........................214/16.4 A, 250/220 R
[51] Int. Cl. .................................................B65g 1/06
[58] Field of Search....33/96 AT, 46 AS; 214/16.4 A; 250/220 R; 187/29 P, 29 F, 29 R

[56] References Cited

UNITED STATES PATENTS

| | | |
|---|---|---|
| 3,232,455 | 2/1966 | Fountain et al........214/16.4 A |
| 3,486,640 | 12/1969 | Lemelson.............214/16.4 A |
| 2,000,704 | 5/1935 | Lademann....................187/29 |
| 2,804,218 | 8/1957 | Sylvester et al.......214/16.4 A |
| 2,309,730 | 2/1943 | Hastings, Jr. .........214/16.4 A |
| 3,268,097 | 8/1966 | Armington, Jr. et al......................214/16.4 A |
| 3,412,876 | 11/1968 | Calabrese.............214/16.4 A |

*Primary Examiner*—Gerald M. Forlenza
*Assistant Examiner*—Lawrence J. Oresky
*Attorney*—Littlepage, Quaintance, Wray & Aisenberg

[57] ABSTRACT

Stacker attachments have upper and lower photoelectric devices for precisely positioning a carrier opposite a desired storage rack location. The lower photoelectric device is activated when a storage sequence of the stacker is intended. The upper photoelectric device is energized when a load retrieval sequence is intended. An operator generally positions a stacker carriage in the desired area before activating the photoelectric devices.

6 Claims, 4 Drawing Figures

INVENTORS
ALEXANDER WEISKER
RAYMOND L. SMITH JR.

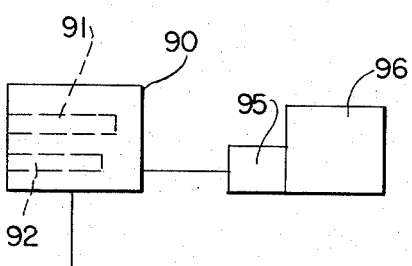
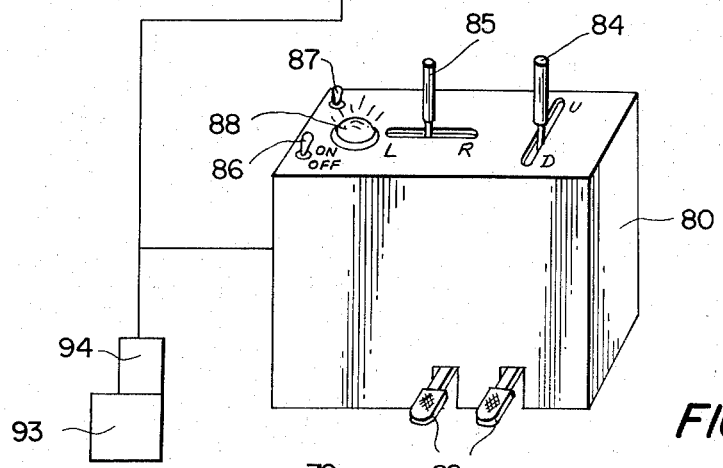
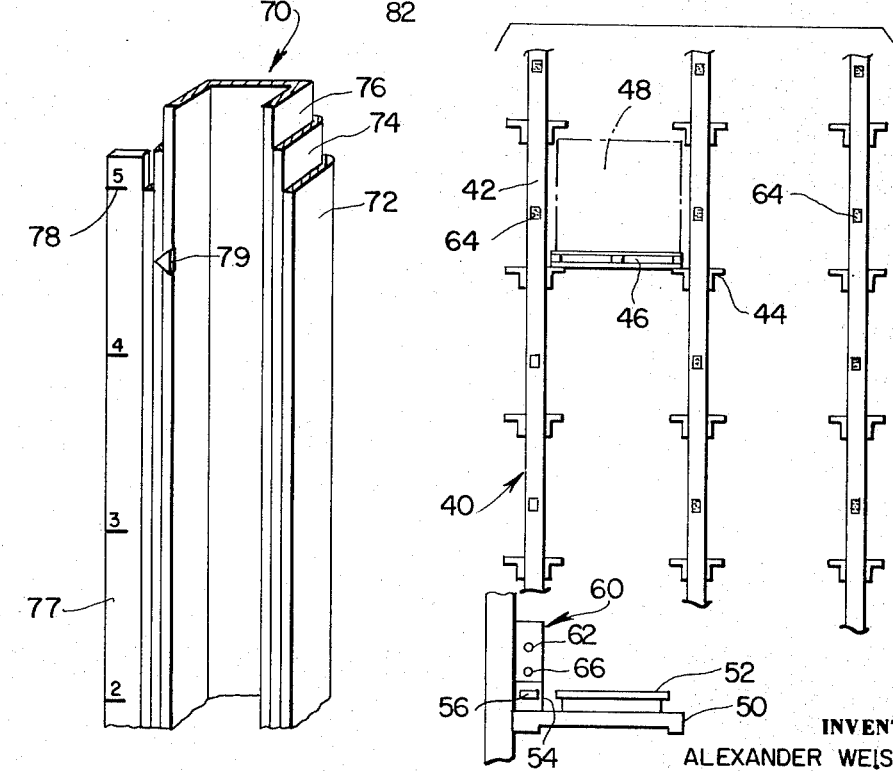
FIG. 4
FIG. 2
FIG. 3
INVENTORS
ALEXANDER WEISKER
RAYMOND L. SMITH JR.
Littlepage, Quaintance, Wray & Eisenberg
ATTORNEYS

MATERIALS HANDLING STACKER POSITIONING APPARATUS

BACKGROUND OF THE INVENTION

A materials handling truck stacker apparatus is generally described in a copending application, Ser. No. 22,436 filed Mar. 25, 1970, for material handling truck apparatus. Use of photoelectric devices to locate desired storage areas in racks serviced by stacker cranes are well known. Some particular systems are described, for example, in U.S. Pat. Nos. 3,119,501, 3,474,919 and 3,486,640. Known photoelectric systems are usually designed for completely automatic computer controlled warehousing systems in which manual control is completely absent.

While the present apparatus may be useful in such systems, systems heretofore known have not been useful for manual control. To provide optimum use of warehousing space, the clearance between a load and rack members should be at a minimum. The problem of stacker and rack alignment is multiplied by the necessity of maintaining clearances between loads and racks at a minimum.

In all warehousing systems where an operator must precisely locate a load in a storage rack or must precisely position forks or a shuttle in or under a pallet, the precise positioning of the forks creates a problem. The problem is magnified in warehouses having high storage facilities. It is extremely difficult for an operator on the ground to align a carrier in a storage location.

SUMMARY OF THE INVENTION

A materials handling apparatus carriage is equipped with two position sensing means. The position sensing means have energy sources and energy sensors which detect energy reflected for the specific locations on the storage rack. One of the position sensors is employed when a carriage is being positioned to transfer a load from the materials handling vehicle to the storage rack. The second position sensor is used when a load in the storage rack is to be retrieved by the vehicle.

In a preferred form of the invention the position sensors are located one above the other, with the lower sensor being activated for a storage cycle and the upper sensor being activated for a retrieval cycle. Alternatively, the sensors may be located side by side for cooperating with respective vertically spaced reflectors on the rack surface. In a preferred form of the invention, each position sensor has a light source and a photocell which respectively transmits and receives light along a same direction. Retro-reflectors are mounted on a storage rack at appropriate positions.

Because the problem of carrier alignment with storage rack location is especially acute in a system in which an operator at floor level must accurately align stacker forks or shuttles at high level, the invention is particularly described with reference to the use of a materials handling truck and more particularly with reference to its use in a side loading stacker attachment for a conventional materials handling truck.

As described in the copending patent application, the carriage of the stacker of the present invention is mounted on a base which may be connected to forks of a lift truck, which may be connected to the vertically moving carriage of a lift truck from which forks have been removed, for vertical movement along the mast of the lift truck, or the carriage may be connected to a base which is a mast configured in turn for connecting to a body of a lift truck or to the conventional mast of a lift truck. In the latter form, the base may consist of merely a mast, or a mast and a generally rectangular supporting structure with rollers to engage roller rails along the racks for guiding the stacker and with rollers for supporting the stacker on the floor.

When the apparatus of the stacker is used with stacker crane apparatus, base refers to the crane mast. The apparatus of the present invention has usefulness with materials handling trucks of the conventional fork lift variety wherein truck operators may experience alignment of forks with a rack structure and loads therein.

A carriage is directed to an approximate desired location with respect to a storage rack. Fine adjustment of the carriage is accomplished after one of the position sensors has been activated. For example, an operator having a loaded carrier may drive a truck between storage racks while raising the carriage to the approximate level of the storage rack. A pointer on a lower edge of the truck or attachment may be located precisely with an index on the floor or on the columnar members of a storage rack. A rough index may be positioned in front of the driver for indicating the approximate level of the carriage. As an example, if it is desired to deposit a load in level 8, after an indicator has passed the level 7 position, the operator activates the lower position sensor and manually controls the further raising of the carriage to a point where an indicator light on the panel, or on the carriage, flashes on, showing that the lower position sensor is exactly opposite a retroreflector at level 8. If the light flashes off, the operator knows that the carriage has passed the location, and the operator inches the carriage downward to a point where the light remains on. The operator then directs a lever or depresses a switch to move the load sideward into the rack. The carriage is inched downward to a point where the load is borne by the rack, and the carrier is withdrawn to a central position on the carriage. The sideward, downward and inward motions which are necessary to deposit a load in the rack may be controlled by the operator, or may be predetermined by a series of switches in the operator's controls.

In a preferred form of the invention, the same limit switch which stops the outward movement of the carrier into the rack causes the extinguishing of the lower light and the energizing of the upper light. The operator simply lowers the carriage until the upper light intercepts the rack mounted reflector which activates the upper photocell and lights the signal light. The operator then withdraws the carrier to its central position on the carriage.

In the retrieving operations, sequences are similar. An operator aligns a truck with the appropriate rack column and raises or lowers the carriage until it is nearly opposite the desired bin of the rack. The upper light source is energized, and the operator continues the vertical movement of the carriage until the signal light is lit. The operator shifts the lever or pushes the button that causes outward movement of the carrier in the desired sense of direction, and the carrier moves outward into the rack, beneath the pallet in the case of the shuttle, or into the pallet when the carrier comprises forks. The limit switch which stops outward movement of the carrier extinguishes the upper light and lights the lower light. As the carriage is moved upward to lift the load, the lower light is aligned with the rack reflector, and the signal light is lit. The upward movement of the carriage is ceased, and the carrier is withdrawn to its central position on the carriage, bearing the load.

In a well known manner, the system is provided with interlocks which prevent outward movement of the carrier until the preselected position sensor photocell is illuminated. In the same manner, backward movement of the carrier may be prevented until the alternate photocell is illuminated.

The storing cycle, or the retrieving cycle, and the position sensor activation may be automated using commercially available limit switches and relays in well known circuit technology.

Operating in an automatic configuration, a stacker carriage may be driven to the appropriate column by an operator. If level 9 is preferred, after the operator's indicator shows that level 8 has been passed, the operator presses the left button or the right button. A load switch on the carriage determines whether the carrier has a load thereon. If the load switch is depressed, indicating the presence of a load, the lower photoelectric system is energized. When the lower photoelectric cell is opposite the reflector, elevation of the carriage is automatically stopped in a well known manner. A time delay in the circuit insures continued illumination of the lower photocell which indicates that the carriage has been stopped before the carrier is moved outward. A limit switch stops outward movement in the carrier, lights the upper light source and causes downward movement of the carriage until the upper photocell is illuminated. Thereupon, the carrier is immediately withdrawn toward the carriage where a limit switch stops its inward movement and extinguishes the light source. The automatic retrieval mode operation is the reverse of the storage cycle.

In the manual mode of operation, the operator's control panel is provided with a three position carriage control, raise, lower and stop, which is equipped with motor speed control, and a three position carrier control, left, right and center.

A switch allows the operator to select the upper or lower position sensor, and another switch allows the equipment to operate without the position sensor. Alternatively, a three position switch may be employed for the sensors, upper, lower and off. When the apparatus is operating with the position sensors, lock out switches prevent outward movement of the carrier until a selected photocell is illuminated.

One object of the invention is the provision of precise alignment apparatus for stacker carriages. Another object of the invention is the provision of a stacker attachment for a lift truck having vertical alignment apparatus for aligning the attachment carriage with a storage rack when the carriage is far from the operator's position.

The invention has as another objective the provision of coarse and fine alignment apparatus for material handling stacker apparatus.

These and other objects of the invention will be apparent from the foregoing and continuing specification which includes the claims and from the drawings.

BRIEF DESCRIPTION OF THE DRAWINGS

FIG. 2 is a detail of a shuttle-type carriage positioner.

FIG. 3 is a detail of one form of a rough indicator of carriage position.

FIG. 4 is a schematic representation of a control for the positioning apparatus.

DETAILED DESCRIPTION OF THE DRAWINGS

Figure 1:
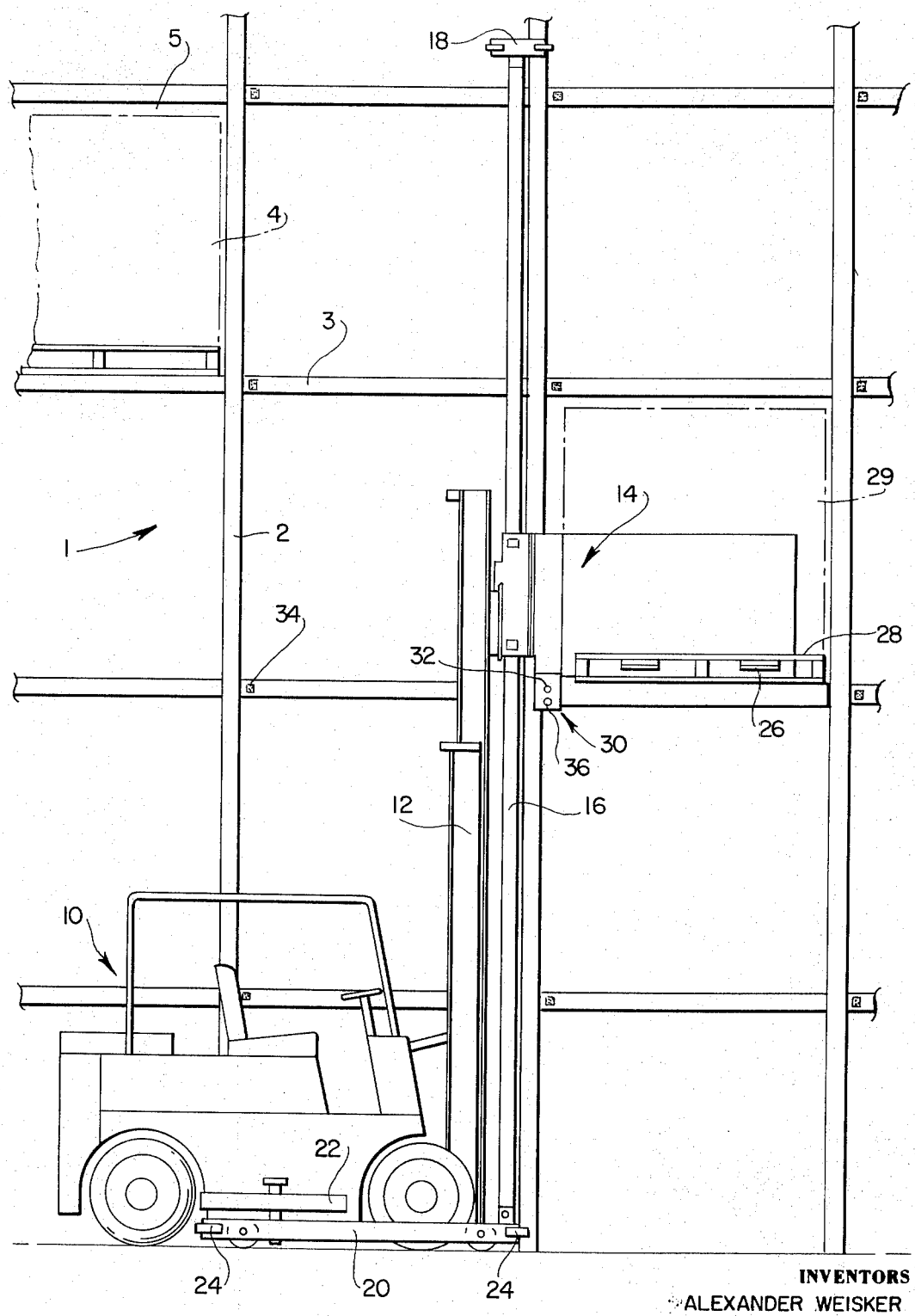
FIG. 1 is a side elevation of the materials handling stacker apparatus and a storage rack.

In FIG. 1, a rack structure is generally indicated by the numeral 1. Vertical columns 2 support cross members 3 on which loads 4 are stored. To make optimum use of storage space, clearance 5 must be as small as possible. Consequently, precise positioning of a carriage is necessary.

Truck 10 has a telescoping mast 12 which is configured for raising a carriage generally indicated by numeral 14. Carriage 14 rides on a stacker attachment mast 16 which has a guide 18 with rollers which roll along an upper track. The lower portion 20 of the attachment has spaced parallel bars with a rearward clamp 22 for connecting the attachment to the body of a lift truck. Guide rollers 24 guide the entire apparatus in an aisle between parallel racks.

Carriage 14 has a carrier which may move in and out in the direction of racks to pick up and deposit loads therefrom and therein. Forks 26 carry a pallet 28 on which a load 29 is supported.

Fine positioning of the pallet and load adjacent the rack is accomplished by the position sensing means 30 which is mounted on carriage 14. Upper photoelectric system 32 aligns with reflective patches 34 on rack 1 for positioning carriage 14 with forks 26 at the proper height to retrieve a pallet from the rack. The lower photoelectric system 36 aligns with patches 34 to position forks 26 at a higher level such as required at the beginning of a storing sequence.

FIG. 2 is a detail of a shuttle-type stacker which is useful with a rack 40 having vertical columns 42 and load supporting cleats or rails 44. Pallets 46 hold loads 48 on the cleats 44.

Carriage 50 has a shuttle 52 which may move in and out of the racks between the cleats 44. An actuator assembly 54 moves roller 56 outward to contact the vertical columns 42 to prevent sideward tipping of the stacker. The precise positioning apparatus 60 is located directly above the housing of actuator 54. Upper photocell 62 aligns with retroreflective tape 64 on column 42 to position the shuttle 52 opposite rack 40 below cleats 44 to pick up a load. Lower photocells 66 position carriage 50 opposite rack 40 so that carrier 52 is above cleats 44 in a position to carry a load into the rack structure. In this embodiment retro-reflective patches 64 are above the level of the support 44 to provide room for the lateral support 56.

FIG. 3 schematically represents a rough indicator for providing information to the operator as to the general position of the carriage with respect to the rack. A lift truck telescoping mast 70 has an outer fixed portion 72, a central portion 74 and an inner portion 76. A scale 77 with indicia 78 is attached to the fixed mast portion 72, and a pointer 79 is attached to the inner movable mast portion 76. Pointer 79 generally indicates the position of the carriage with respect to the rack positions which are numerically represented on scale 77. If level 5 is desired, for example, the appropriate photocell system is activated when pointer 79 is somewhere between indications 4 and 5 on the scale.

FIG. 4 schematically represents a control panel 80. Pedals 82 control horizontal movement of the stacker apparatus and braking thereof. Lever 84 controls the up and down movement of the carriage and telescoping mast in three positions, up, down and lock. Control lever 84 is provided with inching controls whereby slight displacement of the lever causes slow carriage motion. Lever 85 controls left and right movement of the carrier to and out of the rack. Switch 86 turns the fine positioning system on and off, and switch 87 selects the upper or lower photocells and light sources. Lamp 88 is illuminated when the selected source and photocell are in alignment with a reflective patch. As soon as lamp 88 lights, lever 85 may be moved to the left or to the right to effect the desired storage or retrieval sequence.

A fine positioning system 90 has an upper light source and photocell system 91 and a lower light source and photocell system 92 which are controlled individually by switch 87 and collectively by switch 86. Carriage elevating motor 93 may be turned off by control 94 when the selected photocell is illuminated. Control 95 prevents operation of carrier motor 96 until the selected photocell has been illuminated.

While the invention has been particularly shown and described with reference to a preferred embodiment thereof, it will be understood by those skilled in the art that various changes in form and details may be made therein without departing from the spirit and scope of the invention.

What is claimed is:

1. Materials handling stacker apparatus comprising: a base, carriage means connected to the base for vertical movement adjacent a fixed rack structure, a plurality of storage bays in the rack structure, each bay having a single marker mounted on the rack structure adjacent the bay, first and second position sensing means including energy source means and energy sensing means mounted on the carriage means, energizing means connected to the position sensing means for selectively energizing one of the position sensing means and deenergizing the other of the position sensing means, selector means connected to the position sensing means for selecting the first or second means, control means connected to the position sensing means for operating when an energy sensing means of a selected and energized position sensing means senses energy of a predetermined amount, which indicates that the energized position sensing means on the carriage means is directly opposite a marker adjacent a bay in the rack structure, and wherein the first and second position sensing means comprise upper and lower position sensing means, whereby the upper position sensing means is selected by the selector means when a load-withdrawing sequence is intended for the stacker apparatus, and whereby the lower position sensing means is selected by the selector means when a load inserting sequence is intended for the stacker apparatus, further comprising signaling means connected to the control means for producing a discernible signal when an energy sensing means of a selected position sensing means senses energy of a predetermined amount, said discernible signal affecting the senses of an operator to indicate to him to carry out subsequent operations of the carriage means.

2. The materials handling stacker apparatus of claim 1 wherein the first and second position sensing means comprise a first light source projecting light along a beam, a first photoelectric sensor sensing light returning along the first beam, a second light source projecting light along a second beam, and a second light sensor sensing light returning along the second beam.

3. The materials handling stacker apparatus of claim 2 wherein the selector means is connected to the position sensing means for selectively energizing of the first or second light source.

4. The materials handling stacker apparatus of claim 1 further comprising a carrier movably mounted on the carriage means for transverse movements substantially normal to movement of the carriage means, and a carrier motor connected to the carrier and to the carriage means for moving the carrier with respect thereto, and wherein the control means is connected to the carrier motor for enabling operation of the carrier motor when an energy sensing means of a selected position sensing means senses energy of a predetermined amount.

5. The materials handling stacker apparatus of claim 1 wherein the base further comprises indicating means connected to the base for indicating the approximate position of the carriage means with respect to a rack, whereby an operator generally positions the carriage means according to the indicating means and precisely positions the carriage means according to the position sensing means.

6. The materials handling stacker apparatus of claim 5 wherein the base comprises a telescopically extensible mast, and wherein the indicating means comprises a scale attached to a fixed portion of the mast and a pointer attached to a movable portion of the mast, and wherein the carriage means and mast movement are interrelated, whereby the pointer indicates an approximate position of the carriage means with respect to the mast.

* * * * *